United States Patent [19]

Shyi

[11] Patent Number: 4,807,915

[45] Date of Patent: Feb. 28, 1989

[54] STRUCTURE OF MULTI-PROTECTION SAFETY CAR BUMPER

[76] Inventor: David Y. Shyi, 7F-1, No. 687, Chung-Shan N. Rd., Sec. 5, Taipei, Taiwan

[21] Appl. No.: 179,895

[22] Filed: Mar. 28, 1988

[51] Int. Cl.$^4$ ............................................. E05C 19/10
[52] U.S. Cl. .................................. 293/132; 267/139; 293/137
[58] Field of Search .............................. 293/120–122, 293/126, 118, 137, 132, 142, 154, 155; 267/139

[56] References Cited

U.S. PATENT DOCUMENTS 3,361,467  1/1968  Ludwikowski ........................ 293/137
4,466,646  8/1984  Delmastro et al. .................... 293/132
4,498,696  2/1985  Kalchshmied et al. .............. 293/126

Primary Examiner—Sherman D. Basinger
Assistant Examiner—Jesûs D. Sotelo
Attorney, Agent, or Firm—Lowe, Price, LeBlanc, Becker & Shur

[57] ABSTRACT

A new structure of multi-protection safety car bumper to keep a buffer zone between the frame body of the car and the present bumper for the arrangement of U-shaped front steel bar, elastic rubber component, elastic buffer element, U-shaped rear steel bar, U-shaped external bumper and wedged sliding device that comprised of sliding seat and slide guide to place therebetween so as to reciprocally undertake and disperse outside impact force; by the wedged sliding device, the external bumper and the frame body of the car being able to make a relative displacement so as to protect the two side bars of the U-shaped external bumper from not being stressed to extend outward or to drop off.

1 Claim, 4 Drawing Sheets

U.S. Patent  Feb. 28, 1989  Sheet 1 of 4  4,807,915
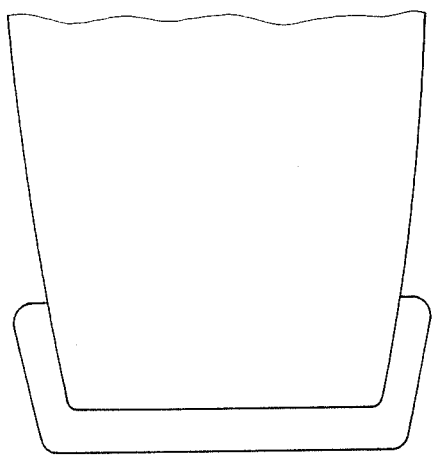
Fig 1-a
Prior Art
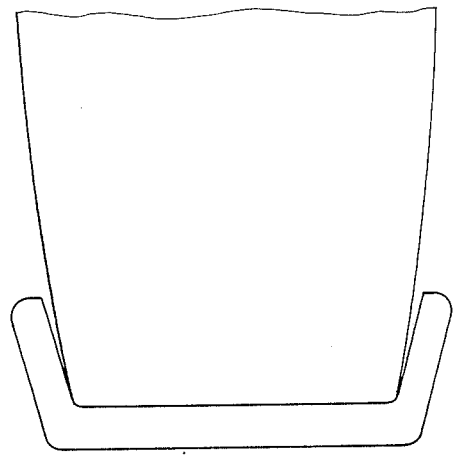
Fig 1-b
Prior Art
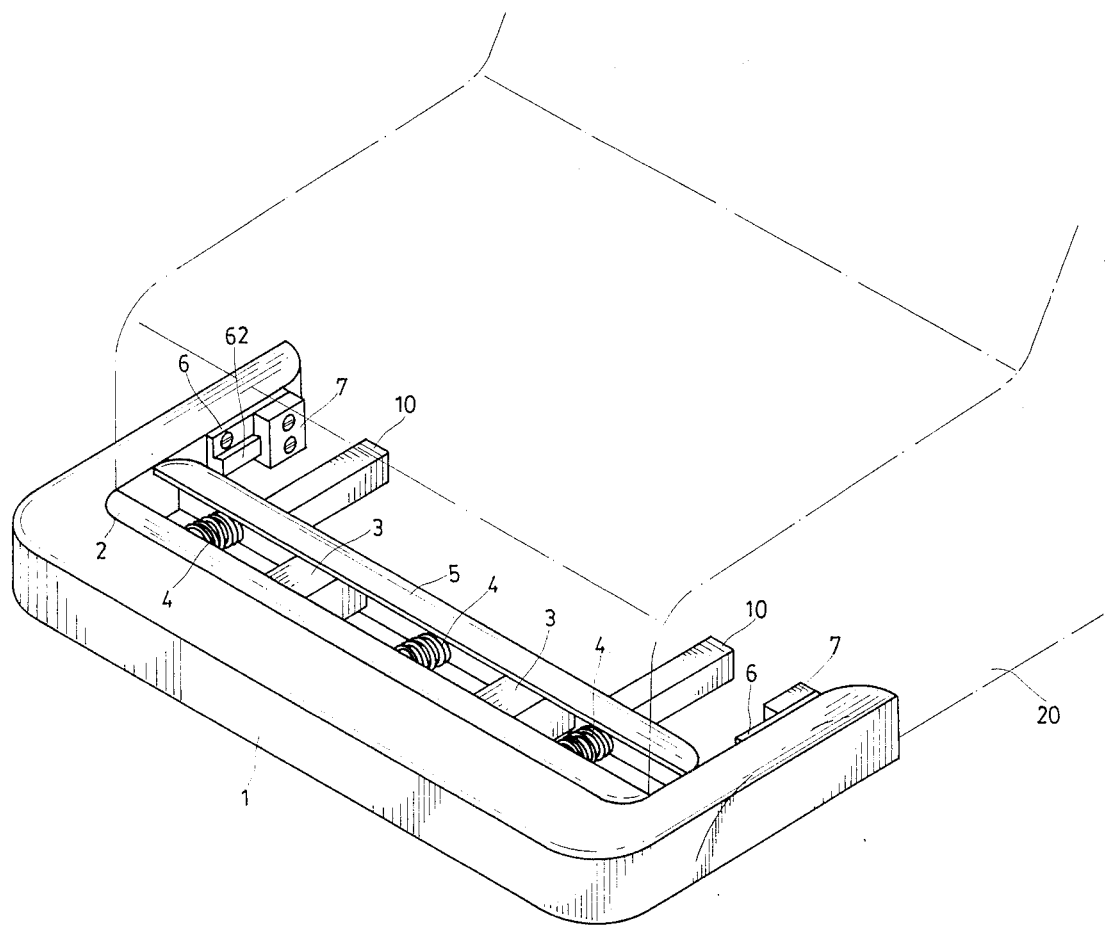
Fig 3

STRUCTURE OF MULTI-PROTECTION SAFETY CAR BUMPER

BACKGROUND OF THE INVENTION

Conventional car bumper, as shown in FIG. 1-a, is directly and firmly connected to the frame body of a car with both side bars firmly attached to the car. When it is struck by outside force, nothing but itself can undertake the force and give a protection. In case the percussive force is heavier than the stress force of the bumper, the bumper and the frame body of the car may be caved or damaged, or even more seriously the car structure may be distorted and damaged; if the percussive force prevails the connecting force of the side bars of the bumper and the frame body of the car, the both side bars of the bumper may be forced to extend away from the car to drop off as shown in FIG. 1-b. From the description, we can understand that the conventional car bumper can give little protection against heavy percussive force. This kind of simple safety device can not realistically well protect the sophisticated and advanced modern cars to provide the rider or the passengers of the car with security. In view of the afore-said, the present invention has been created to offer a multi-protection.

The present invention relates to a new structure of multi-protection safety car bumper and more particularly a bumper that to be mounted to a car at the front so that while the car is struck by light percussive force, the force can be directly absorbed and dispersed by the U-shaped external bumper; while the car is struck by medium percussive force, part of the force will be absorbed and dispersed by the external bumper and the rest of the force will be transmitted to a front steel bar for absorption and dispersion; if the car is struck by heavy percussive force, part of the force will be absorbed and dispersed by the external bumper and the front steel bar, and the rest of the force will be transmitted to an eleastic buffer element and a rear U-shaped steel bar for absorption and dispersion; by means of the above-mentioned arrangement, it provides the car with a multi-protection safety bumper to protect the car from any kind percussive force.

SUMMARY OF THE INVENTION

The present invention is to provide a new structure of multi-protection safety car bumper, composed of U-shaped external bumper, front U-shaped steel bar, elastic rubber component, elastic buffer element, rear U-shaped steel bar, wedge-shaped sliding device that is comprised of a sliding seat and a slide guide, and a plurality of bolts and nuts, wherein the U-shaped external bumper is interiorly screwed up with the front U-shaped steel bar by means of bolt nuts and is bilaterally screwed up with a sliding seat by bolts to bilaterally match with the respective slide guide that are bilaterally attached to the body of the car, an elastic rubber component and an elastic buffer element are arranged between the U-shaped front and rear steel bars and the U-shaped rear steel bar is connected to the main frame of the car by the insertion of two location rods; by means of the said components one can assemble the present safety bumper.

BRIEF DESCRIPTION OF THE DRAWINGS

FIG. 1-a illustrates a regular car bumper that has not been struck by percussive force.

FIG. 1-b illustrates a regular car bumper that has been struck by percussive force.

FIG. 3 is a perspective view of the preferred embodiment in application.

DESCRIPTION OF THE PREFERRED EMBODIMENTS

Figure 2:
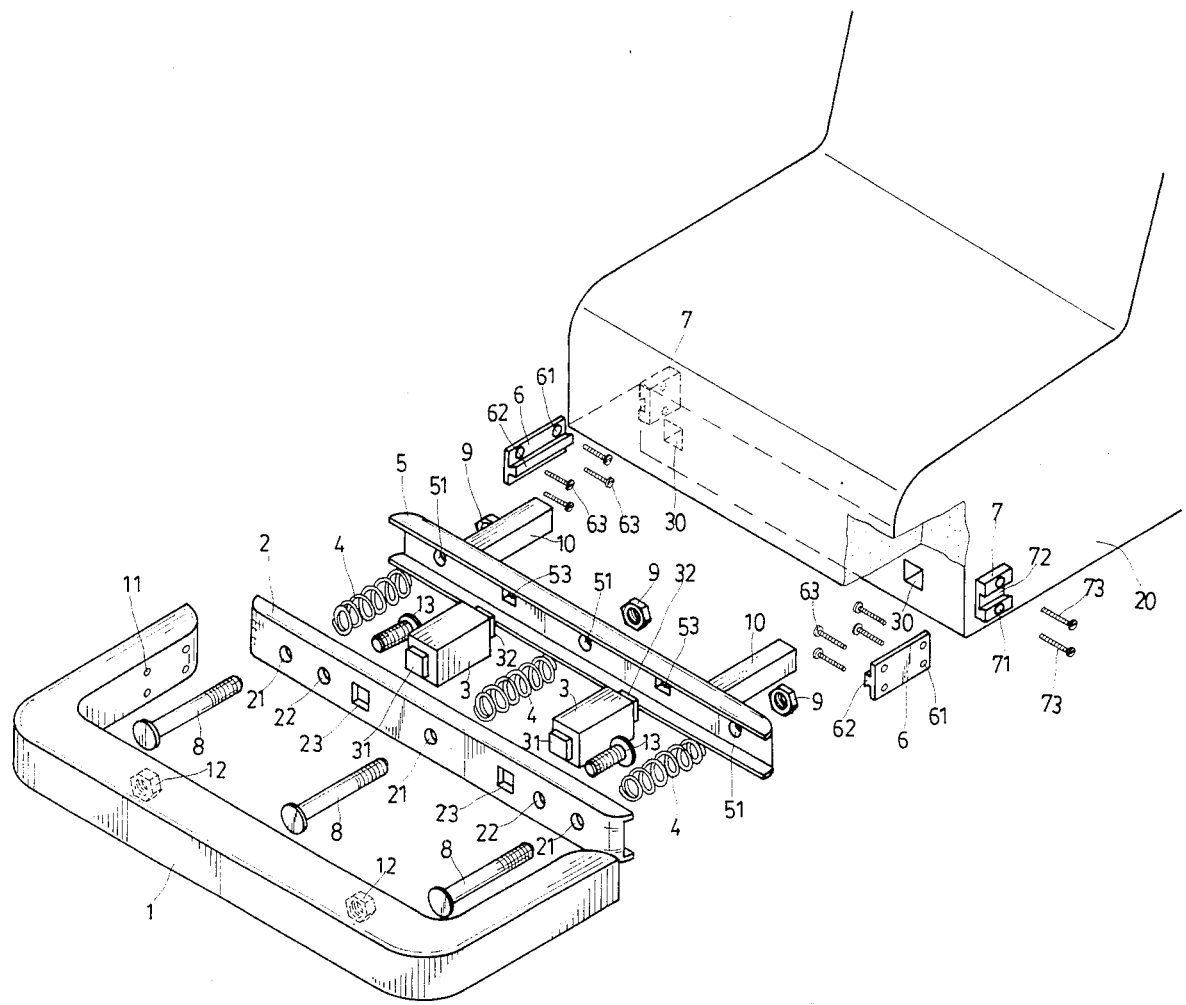
FIG. 2 is a fragmentary perspective view of a safety bumper embodying the present invention.
Figure 4:
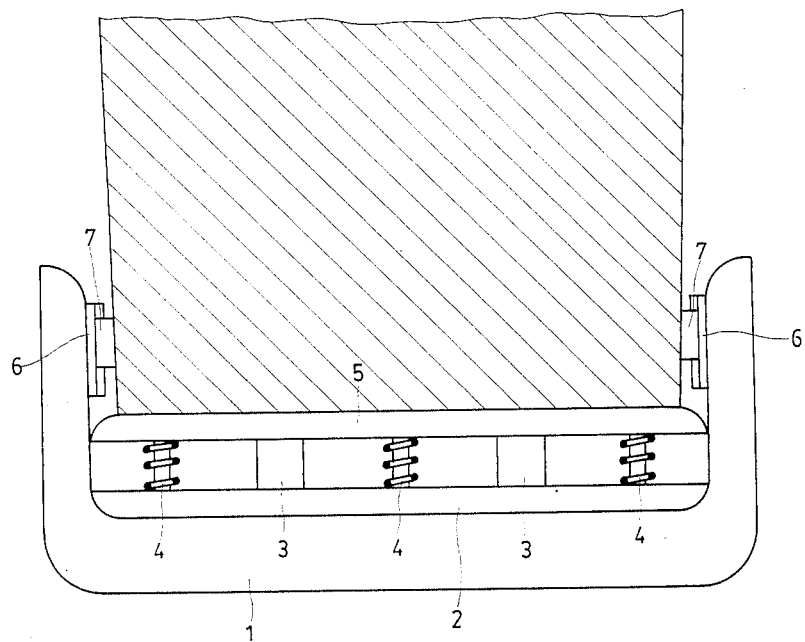
FIG. 4 illustrates the preferred embodiment of the invention in application while undertaking from light percussive force.

As shown in FIG. 3 and FIG. 4, the structure of the present invention is composed of U-shaped external bumper 1, front U-shaped steel bar 2, elastic rubber component 3, elastic buffer element 4, rear U-shaped steel bar 5, wedged sliding device that comprised of sliding seat 6 and slide guide 7, and a plurality of locating bolts 8, 13, 63, 74, and nuts 9, 12. Said U-shaped external bumper 1 has interiorly locating bolt 12 in the center and bilaterally locating bolt hole 11 at the side bar of the bumper for the respective connection with the U-shaped front steel bar 2 and the sliding seat 6 by screw joint. Said U-shaped front and rear steel bars 2 and 5 are symmetrically arranged with respective openings faced each other. Said U-shaped front and rear steel bars 2, 5 also respective and symmetrically comprise a plurality of piercing holes 21, 51, 23, 53, wherein piercing holes 23, 53 are for locating of the both rectangular flanges 31 and 32 of the elastic rubber component 3; each pair of symmetric piercing holes 21 and 51 are for the placement of respective elastic buffer element 4; by means of locating bolt 8 inserting through piercing hole 21, elastic buffer element 4 and piercing hole 51 to screw up with the bolt 9. Said U-shaped front steel bar 2 also comprises a plurality of piercing holes 22 for respective locating bolts 13 to insert into and to screw up the external bumper 1 with the respective locating bolts 12. By means of the above arrangement, the U-shaped external bumper 1, the U-shaped front steel bar 2, the elastic rubber component 3, the elastic buffer element 4 and the U-shaped rear steel bar 5 are assembled together to form a multi-protection safety bumper of the present invention. Furthermore, the sliding seat 6 of the wedged sliding device comprises locating hole 61 for locating bolt 63 to insert thereinto so as to screw up the respective side bar of the U-shaped external bumper 1 together by means of the respective bolt hole 11. The slide guide 7 of the wedged sliding device has locating hole 71 for bolt 73 to insert thereinto and to screw up the slide guide to the side board 20 of the frame body of the car. Said U-shaped rear steel bar 5 has exteriorly two locating rods 10 welded together, said sliding seat 6 has a wedged track 62, and said slide guide 7 has a scoop sliding way 72, the assembled safety bumper is then attached to the car by means of respective insertion of said two locating rods 10 into respective receiving holes 30 of the frame of the car with the wedged track 62 slide into the scoop slide way 72 to have the present invention be well attached for application. When the present invention is mounted to a car, it can protect the car from percussive force in different range as described below:

Please refer to FIG. 4, when a car that equipped with the present bumper is slightly struck by outside percussive force, the U-shaped external bumper 1 of the present invention can undertake and buffer the percussive force in a way that the elastic rubber component 3 and the elastic buffer element 4 between U-shaped front and rear steel bars 2 and 5 are compressed by the inward movement of the external bumper 1 to reduce the distance between U-shaped front and rear steel bars 2 and 5, at the same time, each sliding seat at the respective side bar of the external bumper 1 is simultaneously moved inward and the external bumper is able to move inward at same range by means of the wedged track 62 of the sliding seat through the scoop slide way 72 of the slide guide 7 so as to absorb and disperse the percussive force by means of the displacement of the external bumper and by means of the complement of the elastic buffer element 4 and the elastic rubber component 3, and the external bumper can be kept intact and also forced to return to original position by means of the spring force of the elastic buffer element 4 and the elastic rubber component 3.

Figure 5:
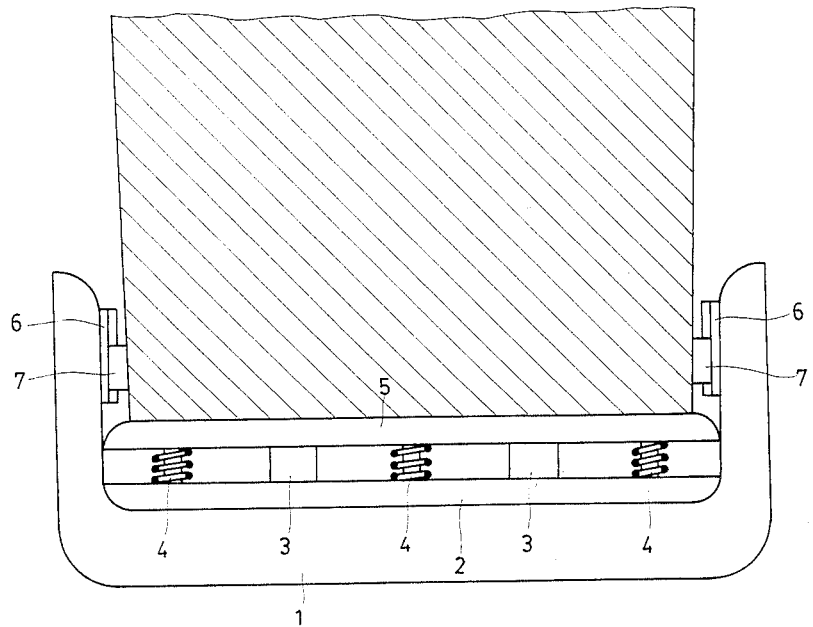
FIG. 5 illustrates the preferred embodiment of the present invention in application while undertaking from medium level of percussive force.

Please refer to FIG. 5, when the car is struck by medium percussive force, the external bumper 1 may not be capable of absorbing the force by itself, and part of the force will be transmitted to the elastic rubber component 3 for absorption, at this time, the elastic buffer element 4 is compressed by the inward force of the external bumper 1 and the elastic rubber component 3 to store spring force, each sliding seat 6 of the external bumper 1 is respectively moving to a fixed distance through the scoop slide way 72 of the respective slide guide to let the car be able to absorb and disperse part of the percussive force by means of the effect of the external bumper 1, the U-shaped front steel bar 2 and the elastic rubber component 3, letting the external bumper directly moving inward to keep two side bars intact; when the percussive force is released, the U-shaped external bumper 1 is then returned to original position by means of the spring force of the elastic buffer element 4 and the elastic rubber component 3.

Figure 6:
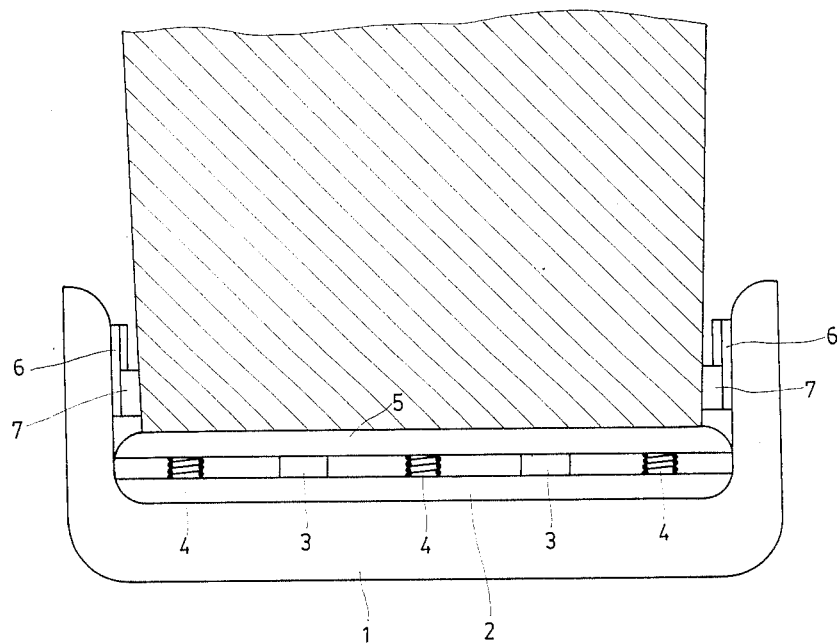
FIG. 6 illustrates the preferred embodiment of the present invention in application while undertaking a heavy percussive force.

Please refer to FIG. 6, when the car that is equipped with the present invention is struck by heavy percussive force, the U-shaped external bumper 1, the U-shaped front steel bar 2 and the elastic rubber component 3 can not absolutely absorb the percussive force, the percussive force over the absorption of the said three parts is then absorbed and dispersed by the elastic buffer element 4 and the U-shaped rear steel bar 5 so that any heavy percussive force can be moderated, absorbed and dispersed by the effect of a cluster of absorbing, compressing and springing back of the U-shaped external bumper 1. U-shaped front steel bar 2, elastic rubber component 3, elastic buffer element 4 and U-shaped rear steel bar 5. As soon as the percussive force is released the external bumper will soon return to its original position by means of the spring effect as previously described.

Because of the effect of the wedged track 62 and the scoop slide way 72, when the U-shaped external bumper 1 is forced inward, the two side bars of the external bumper 1 are simultaneously moved inward by means of respective wedged track 62 through respective scoop slide way 72. Therefore, when the U-shaped external bumper 1 is struck by percussive force, the U-shaped external bumper 1 will move inward immediately to absorb and disperse the percussive force by means of the variety of components so as to protect the U-shaped external bumper 1 from being caved or to prevent the two side bars of the bumper from stressing outward or dropping off.

The U-shaped front and rear steel bars 2 and 5, U-shaped external bumper 1 and the frame body of the car are firmly connected together by means of bolts and nuts for easy assembly and dismounting. Furthermore, the steel bars arranged in U-shape are for the convenience of manufacturing:

I claim:

1. A multi-protection car safety bumper, comprising:
a U-shaped external bumper having bolt nuts fixedly attached interiorly at the center thereof, the lateral sides of the U-shaped bumper including a plurality of bolt holes; a front and a rear U-shaped steel bars arranged parallel to each other with their respective openings facing each other, each steel bar including a plurality of axially aligned holes; some of said axially aligned holes being for the securing of elastic rubber components; others of said axially aligned holes being for the placement of elastic buffer elements; said front U-shaped steel bar also including a plurality of holes for locating bolts to insert respectively thereinto and to screw into the bolt nuts of the U-shaped external bumper; said rear U-shaped steel bar comprising two locating rods welded thereon for insertion into respective receiving holes on the frame body of a car;
said elastic rubber components being placed between the front U-shaped steel bar and the rear U-shaped steel bar and comprising one rectangular flange at each end for inserting into the respective axially aligned holes of the front U-shaped steel bar and the rear U-shaped steel bar to absorb and disperse any percussive force transmitted through the U-shaped external bumper; said elastic buffer elements being placed between the front and rear U-shaped steel bars and secured therebetween by means of locating bolts and nuts to absorb and disperse the excessive percussive force that the U-shaped external bumper and the elastic rubber components are unable to absorb and at the time to force the stressed U-shaped external bumper to return to its original position;
a sliding seat including locating holes aligned with said bolt holes on the lateral sides of the U-shaped bumper for receiving bolts to attach said sliding seat to the sides of the U-shaped external bumper at the inner side thereof, and further including a wedged track at the center to match with the scoop slide way of a slide guide;
said slide guide including locating holes for locating bolts to secure said guide on the side board of the car body, the central part of the slide guide comprising said scoop slide way to allow the U-shaped external bumper to move inwardly and outwardly by means of the wedged track through the scoop slide way so as to control the position of the U-shaped external bumper;
said car frame body having a stepped shape at the front, wherein said receiving holes are located at a lower part thereof to retain the structure of the safety bumper, the side board of the frame body providing a firm connection for said slide guide.

* * * * *